United States Patent [19]

Morrison

[11] Patent Number: 4,494,291
[45] Date of Patent: Jan. 22, 1985

[54] APPARATUS FOR CONSTRUCTING CYLINDRICAL STORAGE TANKS

[76] Inventor: Alex J. Morrison, R.R. 1, Gibbons, Alberta, Canada, T0A 1N0

[21] Appl. No.: 273,764

[22] Filed: Jun. 15, 1981

[51] Int. Cl.³ .............................................. B23K 31/02
[52] U.S. Cl. .................................... 29/281.4; 52/745; 228/173 D; 228/184
[58] Field of Search ................. 29/281.1, 281.4, 281.5, 29/281.6, 431, 429; 228/173 D, 184, 17.7, 25, 32; 242/78.6, 78.8; 52/745

[56] References Cited

U.S. PATENT DOCUMENTS

| | | | |
|---|---|---|---|
| 2,751,672 | 6/1956 | Reed | 29/431 X |
| 3,380,147 | 4/1968 | McDonald | 228/184 X |
| 3,838,496 | 10/1974 | Kelly | 228/25 X |
| 3,905,092 | 9/1975 | Houldcroft | 228/173 D |
| 4,121,747 | 10/1978 | McFatter | 228/173 D X |

Primary Examiner—Frederick R. Schmidt
Assistant Examiner—Steven P. Schad
Attorney, Agent, or Firm—Ernest Peter Johnson

[57] ABSTRACT

An apparatus is provided for constructing cylindrical storage tanks from coiled strip steel. The apparatus carries and delivers the coiled strip steel circularly around the base of the tank. The strip steel is aligned and affixed with the overhead tank by a fitting frame provided behind the coil. The tank is thus constructed at ground level from a plurality of adjoined horizontal circular rings of strip steel. As each ring is completed it is progressively elevated on a support structure circularly arranged around the base of the tank. The apparatus includes a wheeled frame assembly, a turntable assembly rotatably mounted on the frame assembly, for vertically supporting the coiled strip steel, and a fitting frame mounted on the frame assembly and positioned to receive the strip steel from the turntable assembly. The fitting frame vertically guides the strip steel into alignment with the tank wall supported thereabove.

22 Claims, 15 Drawing Figures

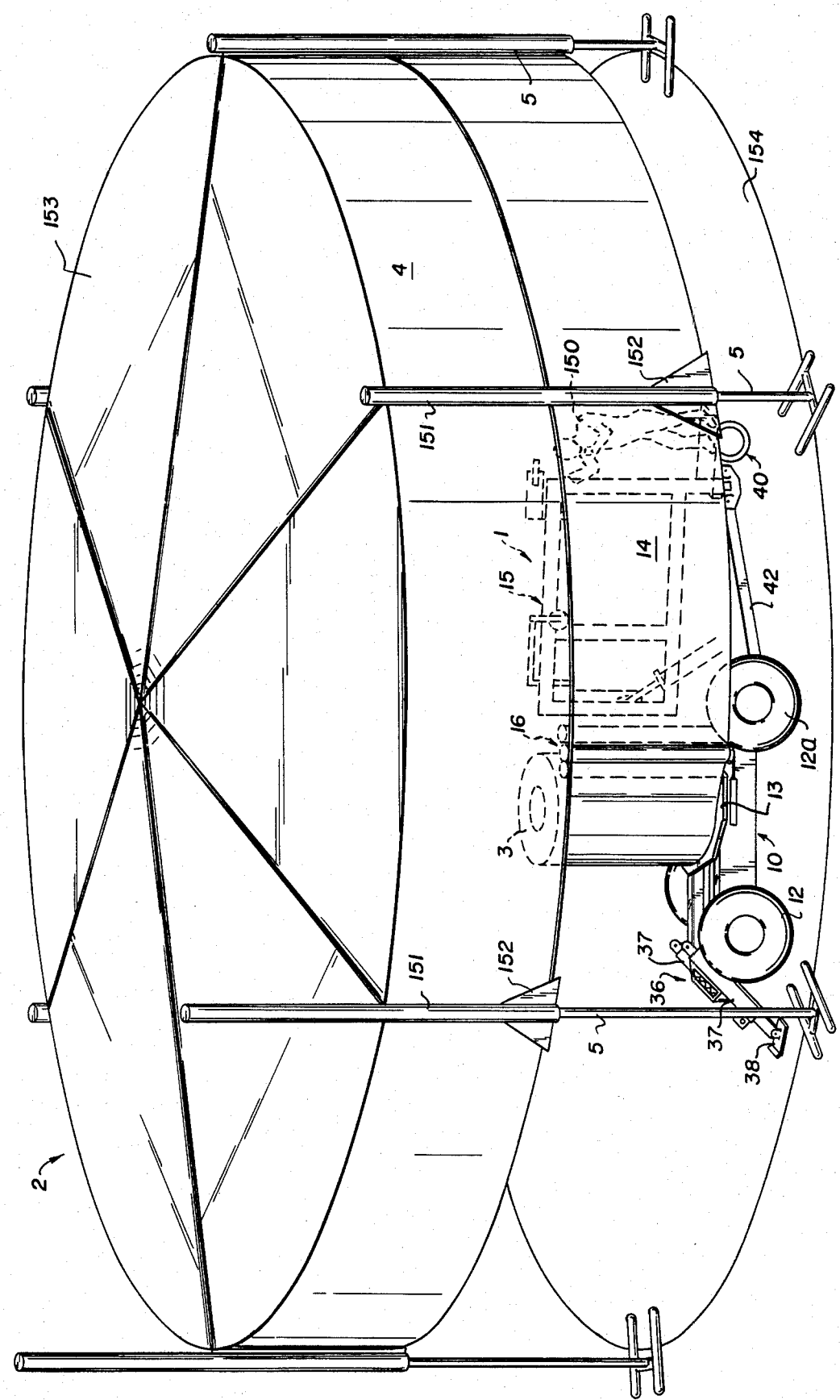

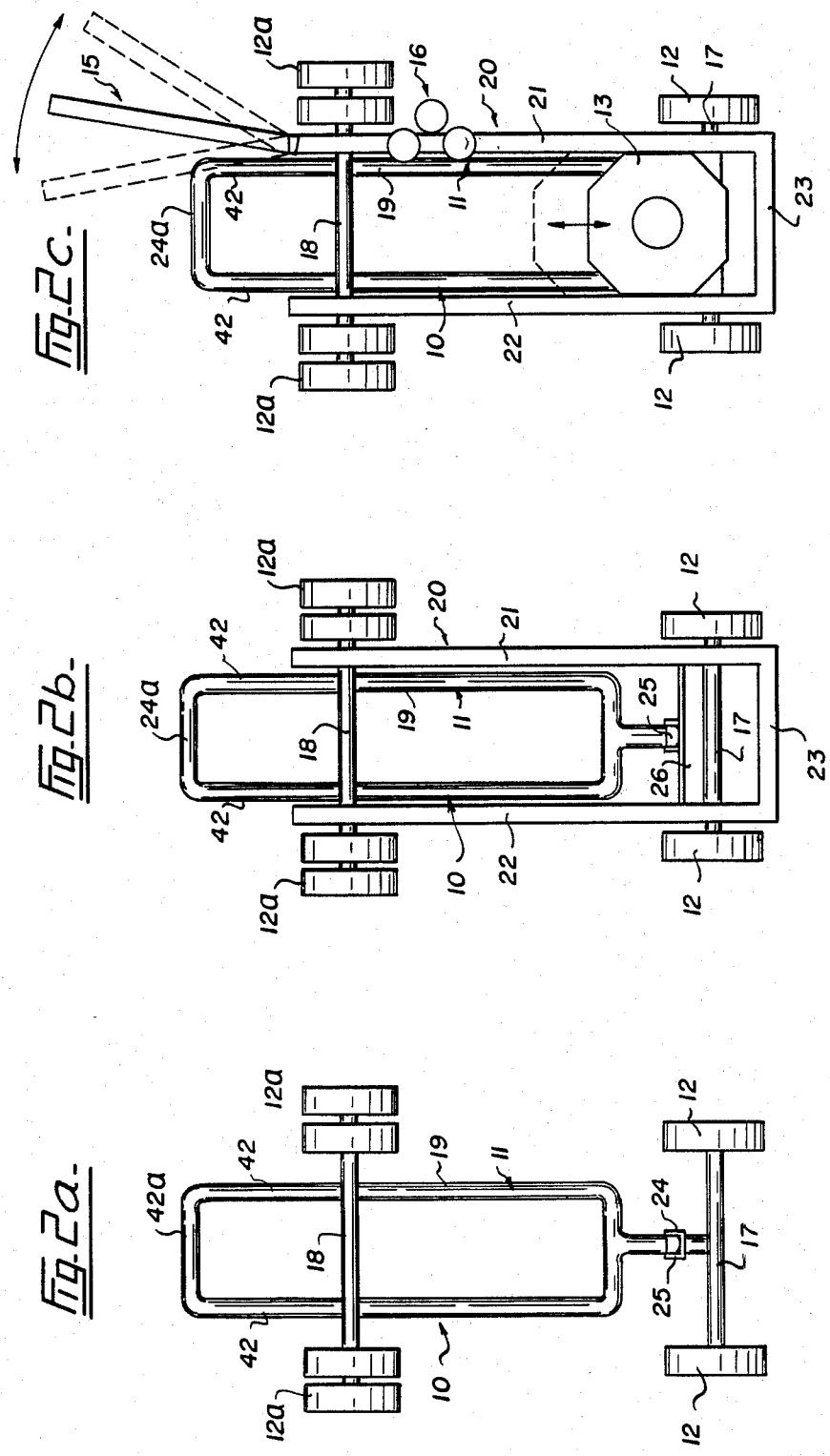

4,494,291

APPARATUS FOR CONSTRUCTING CYLINDRICAL STORAGE TANKS

BACKGROUND OF THE INVENTION

The present invention relates to an apparatus for constructing cylindrical storage tanks from coiled strip steel.

Large diameter cylindrical storage tanks are constructed at chemical plants, pulp mills, municipal water or oil related plants for the storage of products. Conventionally these tanks are fabricated on site from a large number of relatively small pre-formed curved heavy gauge steel plates. The steel plates are slung and placed by a crane or other lifting device and are then tediously hand fitted, tack-welded and finally welded in place. Scaffolding must be erected around the tank to allow the workers to work at the height of the tank under construction. This method of tank construction is hazardous, due to the heights involved, time consuming, due to the tedious hand-fitting involved, and expensive, due to the need for accurately pre-formed, curved steel plates and a large work force.

Attempts have been made to construct these steel tanks directly from coiled steel in order to eliminate the need for the expensive pre-formed steel plates. In U.S. Pat. No. 3,380,147 issued on Apr. 30, 1968, to McDonald, a method of constructing steel tanks from strip steel is disclosed. Strip steel is fed from a coil of steel mounted on a stationary turntable, through a plurality of stationary crimping rollers onto a helically arranged support structure. Thus the steel is fed in a spiraling manner onto the lower tank walls, as the upper, completed tank walls are progressively elevated. The crimping rollers bend the lower edge of the strip steel in the tank wall such that it overlaps the upper edge of the strip steel in the wall therebelow.

In U.S. Pat. No. 4,121,747 issued on Oct. 24, 1978, to McFalter, and in U.S. Pat. No. 4,142,284 issued to Steuber, similar methods are disclosed for constructing helically wound steel tanks from coiled strip steel. Here again the strip steel is pulled from a coil mounted on a stationary turntable, through stationary pinch rollers to provide the proper curvature, through a stationary strip alignment assembly to align the strip with the tank wall thereabove, and onto a helically arranged support structure.

While the above methods may eliminate some of the problems associated with the use of pre-formed steel plates, it appears that they too have drawbacks. Firstly, the upper and lower finished edges of the helically wound tank are uneven. Thus to attach a roof or a floor, these edges must usually be cut off. Secondly, the abovementioned procedures require the rotation of the entire tank as it is assembled. In addition to the energy required to do this, a very stable and complex support system is needed. Further, the use of a stationary turntable for the coil steel, the stationary pinching rollers and the stationary strip alignment assembly, in my view, would require the use of accurately cut and wound coiled steel. While such steel may be available, it would be extremely expensive. In my experience, the coiled steel received from the steel mills is often off specification having uneven strip edges and curvature. Steel having such defects, when used in the prior art devices described, would require constant adjustments of the distantly spaced assemblies in order to feed the steel and fit the steel with the tank wall existing thereabove.

Further, these helically wound systems are limited to handling lightweight steel, for example in the construction of small storage bins for grain and the like. Heavy plate steel cannot be bent by crimping or corrugating operations described above. Also, in large cylindrical tanks the tank wall thickness often needs to be increased in the lower portions of the tank. Helically wound tanks cannot accommodate this change in wall thickness.

SUMMARY OF THE INVENTION

To overcome some of the above-mentioned problems, I have provided an apparatus for constructing cylindrical storage tanks from coiled strip steel, wherein the coil of strip steel is carried circularly around the tank under construction, preferably inside the tank, and the strip of steel is aligned with the tank wall by fitting frame means provided directly behind the coil. The tank is constructed substantially at ground level and is supported by a circularly arranged support structure. The support structure is progressively elevated to raise the tank with its newly completed ring. The tank walls are not helically wound, but rather are constructed from a plurality of adjoined horizontal rings of the strip steel.

The apparatus includes a wheeled frame assembly comprising a chassis frame attached to the wheels, a turntable assembly rotatably mounted on the wheeled frame assembly, for vertically supporting the coiled strip steel, and a fitting frame means mounted on the frame assembly and positioned to receive the strip steel from the turntable assembly. The fitting frame means vertically supports and guides the strip steel into alignment with the tank wall supported thereabove.

In a more preferred aspect of the invention, the wheeled frame assembly comprises both the chassis frame attached to the wheels, and a pivoting frame mounted on the chassis frame for side-to-side and forward-to-backward tilting movement relative to the chassis frame. Means are provided for so pivoting the pivoting frame. The turntable assembly and the fitting frame means are mounted on the pivoting frame for tilting movement therewith. This movement is used to aid in aligning the strip steel with the overhead tank wall.

To further aid in aligning the strip steel, the fitting frame means preferably comprises a fitting arm pivotally mounted to the wheeled frame assembly, or more preferably to the pivoting frame, for generally horizontal movement relative to the chassis frame. Means are provided for so pivoting the fitting arm. The fitting frame means also preferably includes a support means mounted on the fitting arm for supporting the lower edge of the strip steel.

In another preferred aspect of the invention the apparatus also includes straightening roller means, mounted on the wheeled frame assembly and positioned to receive the strip steel from the turntable assembly and to deliver the strip steel to the fitting frame means. The roller means are included to remove a portion of the curvature from the strip steel to fit the curvature of the tank walls. The roller means is preferably attached to the pivoting frame for tilting movement therewith. More preferably, the roller means are also pivotally attached to the pivoting frame for general horizontal movement of the roller means relative to the pivoting frame. This horizontal movement is used to vary the angle of the strip steel delivered to the fitting frame means.

The turntable assembly and the straightening roller means are both preferably rotatably driven to deliver the strip steel to the fitting frame means.

In another preferred aspect of the invention the apparatus also includes a coil pick-up frame pivotally mounted to the frame assembly for picking up a coil of steel laying horizontally on the ground and pivoting the coil into a substantially vertically supported position on the apparatus. The turntable assembly is rotatably mounted on the coil pick-up frame. Means are provided for pivoting the pick-up frame between the vertical coil pick-up position and the horizontal coil unwinding position.

Broadly stated, the invention provides an apparatus for constructing cylindrical tanks from coiled strip steel, wherein the tank walls are constructed at substantially ground level and are vertically supported on a support structure, comprising: a frame assembly comprising a chassis frame adapted for movement around the base of the tank; a turntable assembly rotatably mounted on the frame assembly for substantially vertically supporting the coiled strip steel; and fitting frame means, mounted on the frame assembly and positioned to receive the strip steel from the turntable assembly, for generally vertically guiding the strip steel into alignment with the tank wall expected to be supported thereabove.

The invention also broadly provides a method of constructing a cylindrical storage tank from coiled strip steel, comprising: arranging a support structure circularly around the base of the tank to be supported for vertically supporting the tank walls; delivering a first ring of strip steel around the base of the tank; severing the strip steel and affixing together the abutting ends to complete the first ring of the tank wall; supporting the first ring on the support structure such that its lower edge is at a height greater than the width of the strip steel; carrying the coiled strip steel around the base of the tank while delivering a second ring of strip steel to the tank wall; mechanically aligning, in vertical and horizontal directions, the upper edge of the strip steel as it is delivered with the lower edge of the ring of steel existing thereabove; affixing the upper edge of the strip steel, once it is aligned, with the lower edge of the ring of steel existing thereabove; severing the strip steel once a second ring of steel has been delivered and affixing the abutting ends to complete a second ring of the tank wall; elevating the second ring on the support structure such that its lower edge is at a height greater than the width of the strip steel; constructing additional rings of the tank wall in the manner used to construct the second ring until the desired height of the tank is reached; lowering the tank to ground level; and removing the support structure.

DESCRIPTION OF THE DRAWINGS

FIG. 1 is a schematic drawing of the present apparatus and method for constructing cylindrical storage tanks;

FIGS. 2a, 2b, and 2c are schematic top views of the chassis frame alone, the pivoting frame mounted on the chassis frame, and the turntable, straightening rollers and fitting arm mounted on the pivoting frame;

DESCRIPTION OF THE PREFERRED EMBODIMENT

Figure 3A:
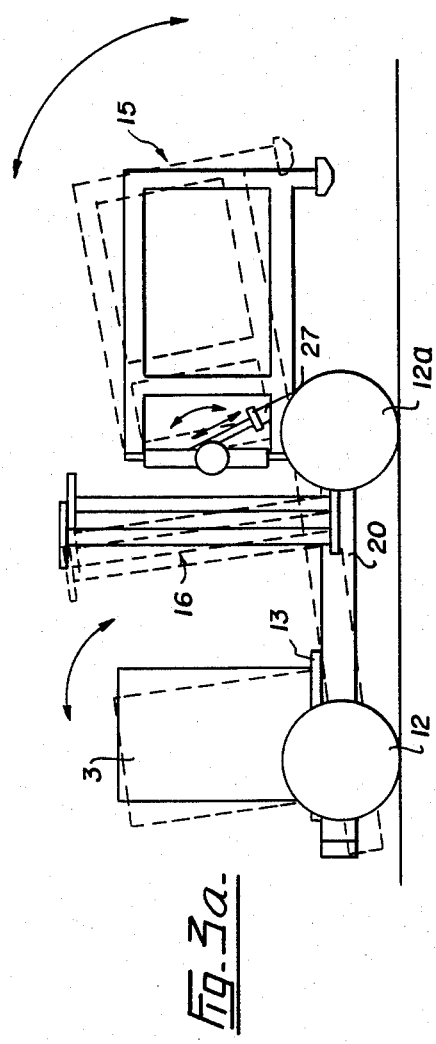
FIGS. 3a, 3b and 3c are schematic illustrations of the pivoting frame of the apparatus, showing the possible movements of the pivoting frame relative to the chassis frame of the apparatus.

With reference to FIG. 1, the apparatus 1 is shown constructing a cylindrical tank 2 substantially at ground level from a coil of strip steel 3. The tank walls 4 are vertically supported by a support structure 5 arranged circularly around the base of the tank 2. As each ring of the tank wall 4 is completed, the ring is elevated by the support structure 5, and the next ring constructed therebelow, again at ground level.

The apparatus 1 is seen to comprise a wheeled frame assembly 10 which includes a chassis frame 11 attached to front and rear wheels 12 and 12a. A turntable assembly 13 is mounted on the frame assembly 10 for substantially vertically supporting the coil 3 of strip steel thereon. The turntable assembly 13 is rotatably mounted on the frame assembly 10 for delivering the strip steel 14 from the coil 3 to the tank wall 4 under construction. In this manner the coil 3 is carried around the base of the tank 2 by the wheeled frame assembly 10 as the tank walls 4 are constructed.

The apparatus 1 also comprises fitting frame means 15 mounted on the wheeled frame assembly 10, rearwardly of the turntable assembly 13. The fitting frame means 15 is positioned to receive the strip steel 14 from the turntable assembly 13 and to generally vertically support and guide the strip steel 14 into alignment with the tank wall 4 supported thereabove.

The apparatus 1 also preferably includes straightening roller means 16 mounted on the frame assembly 10 between the turntable assembly 13 and the fitting frame means 15. The roller means 16 are positioned to receive the strip steel 14 from the turntable assembly 13 and deliver the strip steel 14 to the fitting frame means 15. The roller means 16 are operative to remove at least a portion of the curvature from the strip steel 14, to shape the strip steel to the desired tank curvature.

THE WHEELED FRAME ASSEMBLY

The frame assembly 10 is shown schematically in FIGS. 2a–c. The chassis frame 11 and wheels 12 are shown alone in FIG. 2a. The chassis frame 11 includes front and rear axles 17, 18, interconnected by a Y-shaped tubular member 19.

The turntable assembly 13, the straightening roller means 16, and the fitting frame means 15 are preferably each pivotally mounted on the frame assembly 10 to aid in aligning the strip steel 13 with the tank walls 4. While it is possible to pivotally mount each of these elements separately on the chassis frame 11, the frame assembly 10 preferably includes a pivoting frame 20, onto which the previously mentioned elements can be mounted, for pivotal movement relative to the chassis frame 11. As shown in FIG. 2b, the pivoting frame 20 includes parallel spaced horizontal side beams 21, 22 joined by a front cross member 23.

Figure 3C:
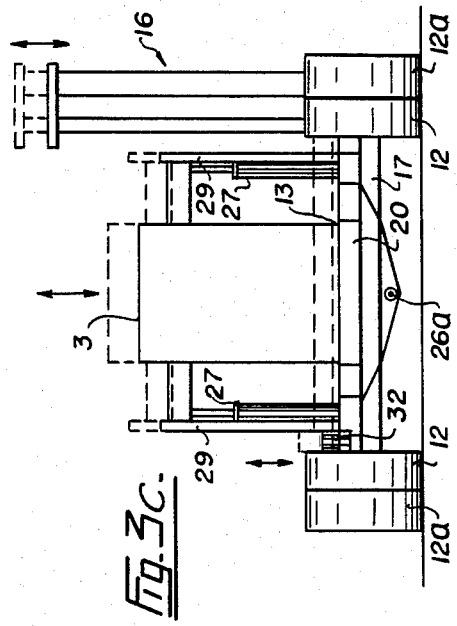
Figure 4:
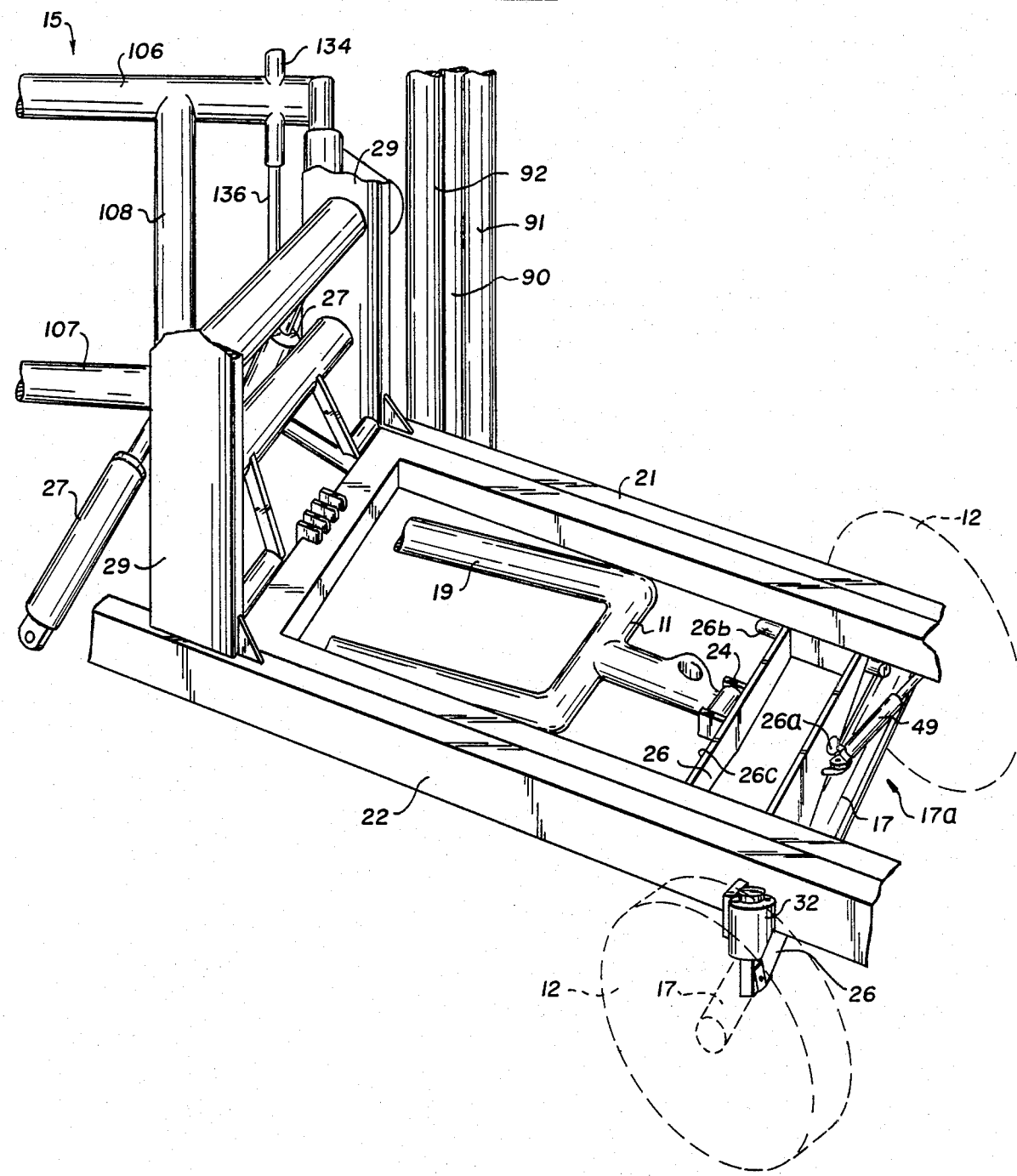
FIG. 4 is a fragmentary front perspective view of the apparatus showing the connections between the pivoting frame and the chassis frame.

The front axle 17 includes a conventional walking beam assembly 17a to allow the front axle 17 to have a side-to-side tilting movement to follow rough ground conditions. This assembly is best shown in FIG. 4. The assembly 17a is common to off-road machinery and therefore is not disclosed in detail herein. A cross beam 26 is pivotally attached above the front axle 17 at pivot point 26a. One end of the cross beam 26 is hinged, through hinge connection 26b, to the side beam 21 of the pivoting frame 20. The opposite end of the cross beam 26 is not directly attached to the side beam 22 of the pivoting frame 20, but rather extends below the side beam 22, ending adjacent the wheel 12. An elevation cylinder 32 is provided between the wheel 12 and the side beam 22. The elevation cylinder 32 is mounted vertically, the piston end being attached to the cross beam 26 and the cylinder end being attached to the side beam 22 as shown. As shown in FIG. 3c, expansion and contraction of the cylinder 32 will lift and lower respectively the front portion of the pivoting frame 20 through the hinge point 26b and the pivot point 26a.

The pivoting frame 20 is pivotally connected with and above the chassis frame 11 by a universal joint 24, preferably located slightly to the rear of the front axle 17. The joint 24 includes a male universal connector 25 (FIGS. 2a and 6) on the chassis frame 11 and a female universal connector 25a (FIG. 6) on the pivoting frame 20. The female universal connector 25a is attached to the vertical rear facing surface 26c of the cross beam 26.

Figure 3B:
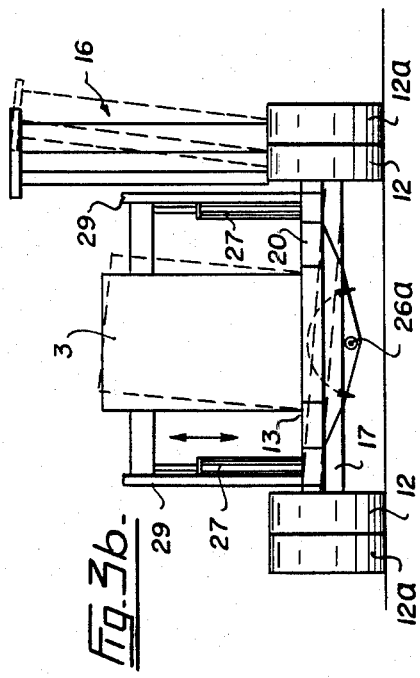

The universal joint connection 24 between the chassis frame 11 and the pivoting frame 20 provides for some forward-to-back and side-to-side tilting movement of the pivoting frame 20 relative to the chassis frame 11. Similarly, any elements mounted on the pivoting frame 20 have tilting side-to-side and forward-to-back movement relative to the chassis frame 11. In FIGS. 2c and 3a and 3b, the turntable assembly 13, the roller means 16 and the fitting frame means 15 are shown to be mounted on the pivoting frame 20 for movement therewith.

Figure 10:
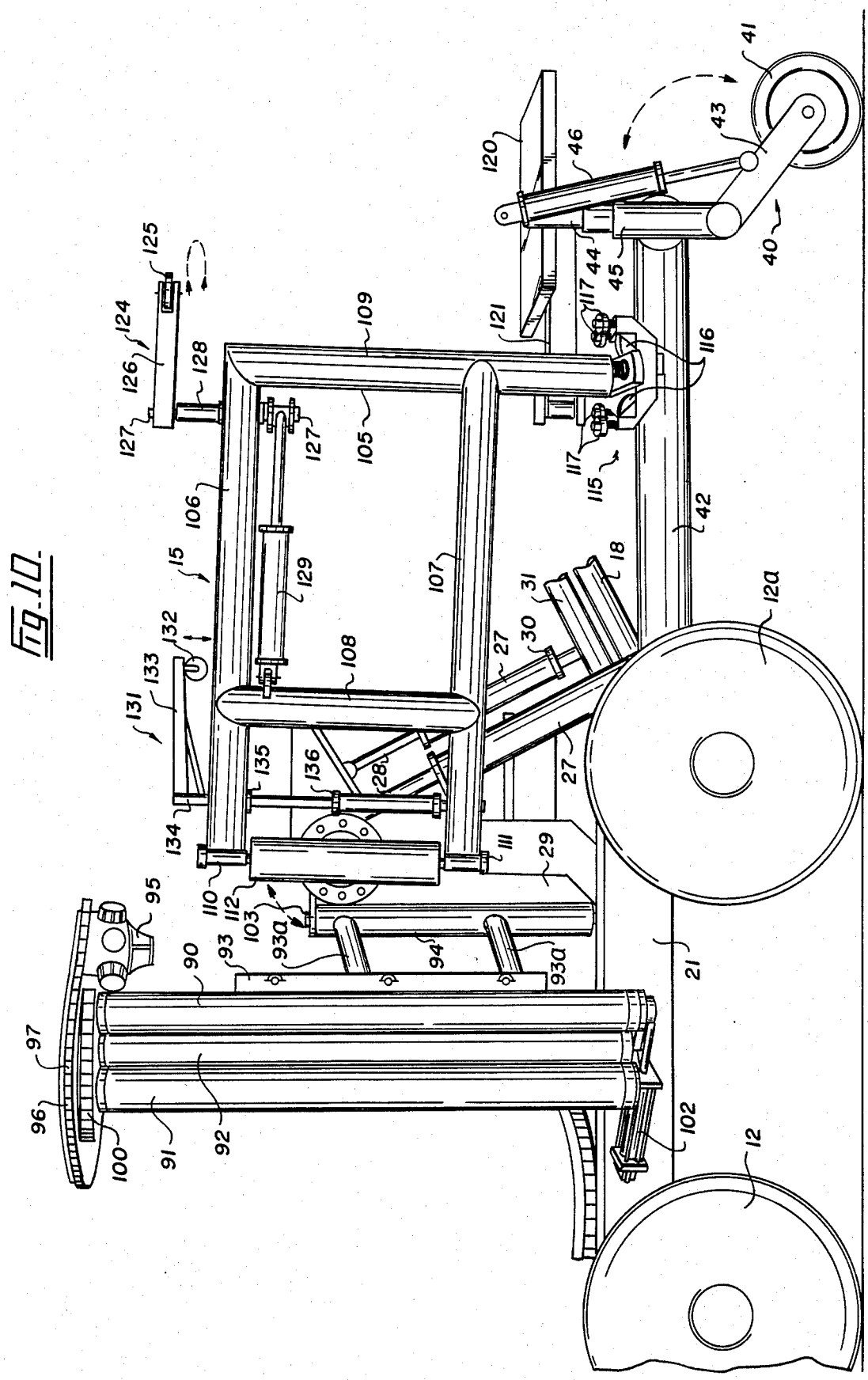
FIG. 10 is a side perspective view of the apparatus showing the details of the straightening rollers and the fitting arm frame.

FIGS. 3a and 3c are included to show schematically the relative movement of the pivoting frame 20 and the elements attached thereto to the chassis frame 11. Movement of the pivoting frame 20 is effected by a pair of hydraulic cylinders 27 positioned at the rear of the apparatus. The cylinders 27 are best shown in FIG. 10. The rod ends 28 of the cylinders 27 are pivotally connected to a pair of upright supports 29 fixed to the pivoting frame 20. The cylinder ends 30 of the cylinders 27 are pivotally connected to a rear cross member 31 of the chassis frame 11. The cylinders 27 are controlled separately to allow for both the side-to-side and forward-to-back tilting movement. As shown in FIG. 3a, simultaneous and even expansion and contraction of the cylinders 27 will pivot the pivoting frame 20 forwardly and backwardly respectively about the universal joint 24. Uneven movement of the cylinders 27, as shown in FIG. 3b, will result in a side-to-side movement of the pivoting frame 20, again about the universal joint 24. If the cylinders 27 are expanded simultaneously with the elevation cylinder 32 the entire pivoting frame 20 is elevated in the manner shown in FIG. 3c.

The elevational movement of the pivoting frame 20 and its attached elements is useful both for aligning the strip steel 14, and for lowering the apparatus 1 as it enters and leaves the tank 2 beneath the elevated tank walls 4.

As mentioned previously, the turntable assembly 13, the roller means 16 and the fitting frame means 15 are each preferably attached to the pivoting frame 20 for pivoting movement therewith. It will be seen that the strip steel 14, supported by the turntable assembly 13, the roller means 16 and the fitting frame 15 (FIG. 9), will thus also follow this pivoting movement. By tying together the pivoting movement of each of these elements 13, 15 and 16, the chance of the strip steel 14 being bent out of shape is minimized.

Figure 5:
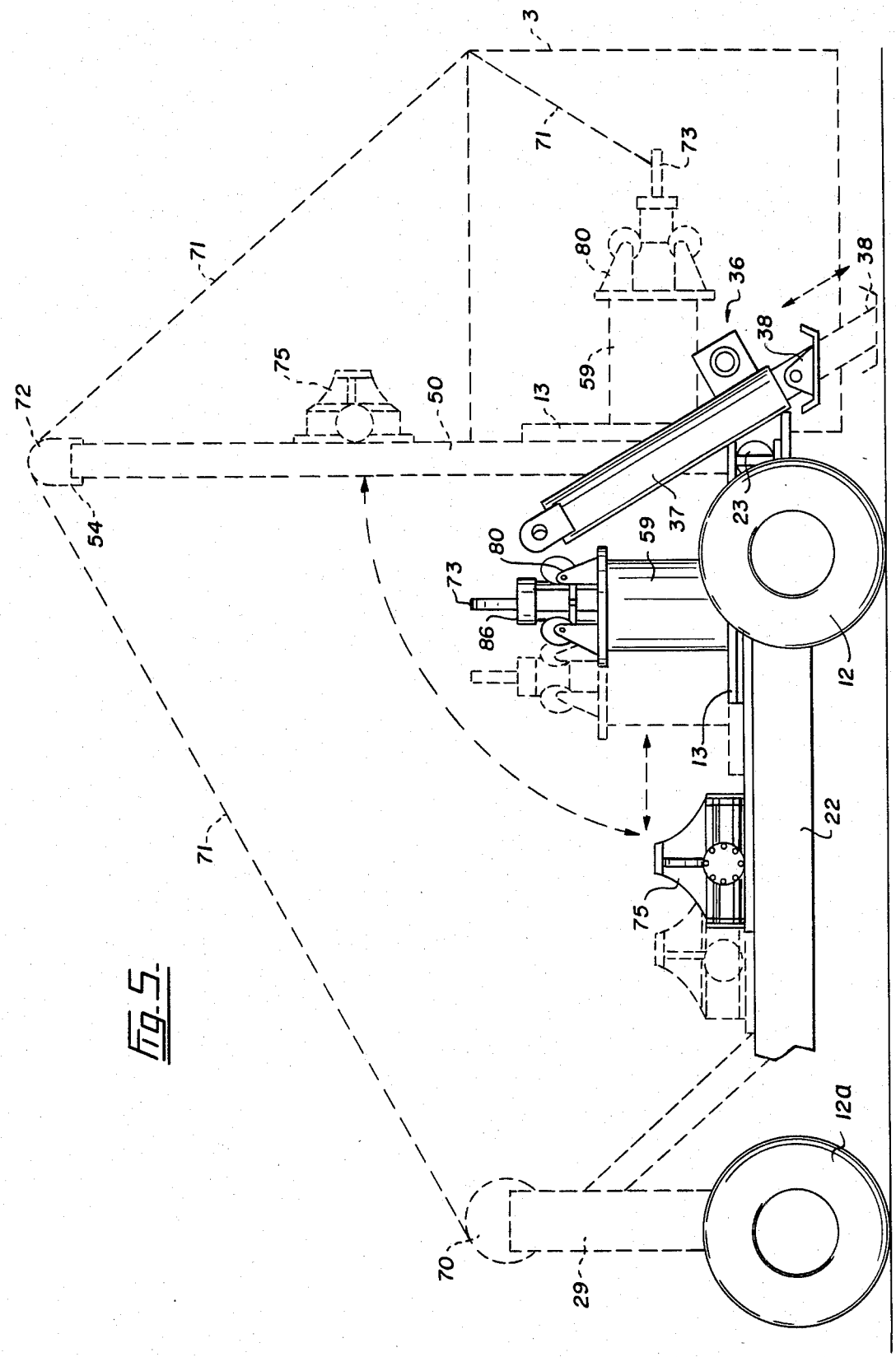
FIG. 5 is a side schematic view of the apparatus showing the movement of the front coil pick-up frame relative to the pivoting frame from a coil pick-up position to a coil unwinding position.

The wheeled frame assembly 10 is preferably stabilized at its front and rear ends to prevent the apparatus 1 from tipping forwardly or rearwardly respectively. As will be discussed later, the apparatus preferably includes a coil pick-up frame 35 at its forward end, for picking up a coil of steel 3 from the ground and pivoting the coil 3 onto the apparatus 1. During this pivoting movement the front end of the apparatus 1 may tip under the weight of the coil 3. Thus, to stabilize the front end, first stabilizing means 36 are attached to the front end of the apparatus 1 for engaging the ground when the coil pick-up frame 35 is being pivoted. These stabilizing means 36, as shown in FIGS. 1 and 5, comprise a pair of outrigger cylinders 37 attached on either side of the front cross member 23 of the pivoting frame 20. Expansion and contraction of these hydraulic cylinders 37 extend and retract respectively the shoes 38 in the manner shown in FIG. 5. The shoes 38 engage the ground in the extended position of the cylinders 37, to thereby stabilize the apparatus 1. During construction of the tank 2 the cylinders 37 are retracted to allow the apparatus 1 to move around the base of the tank 2.

Figure 11:
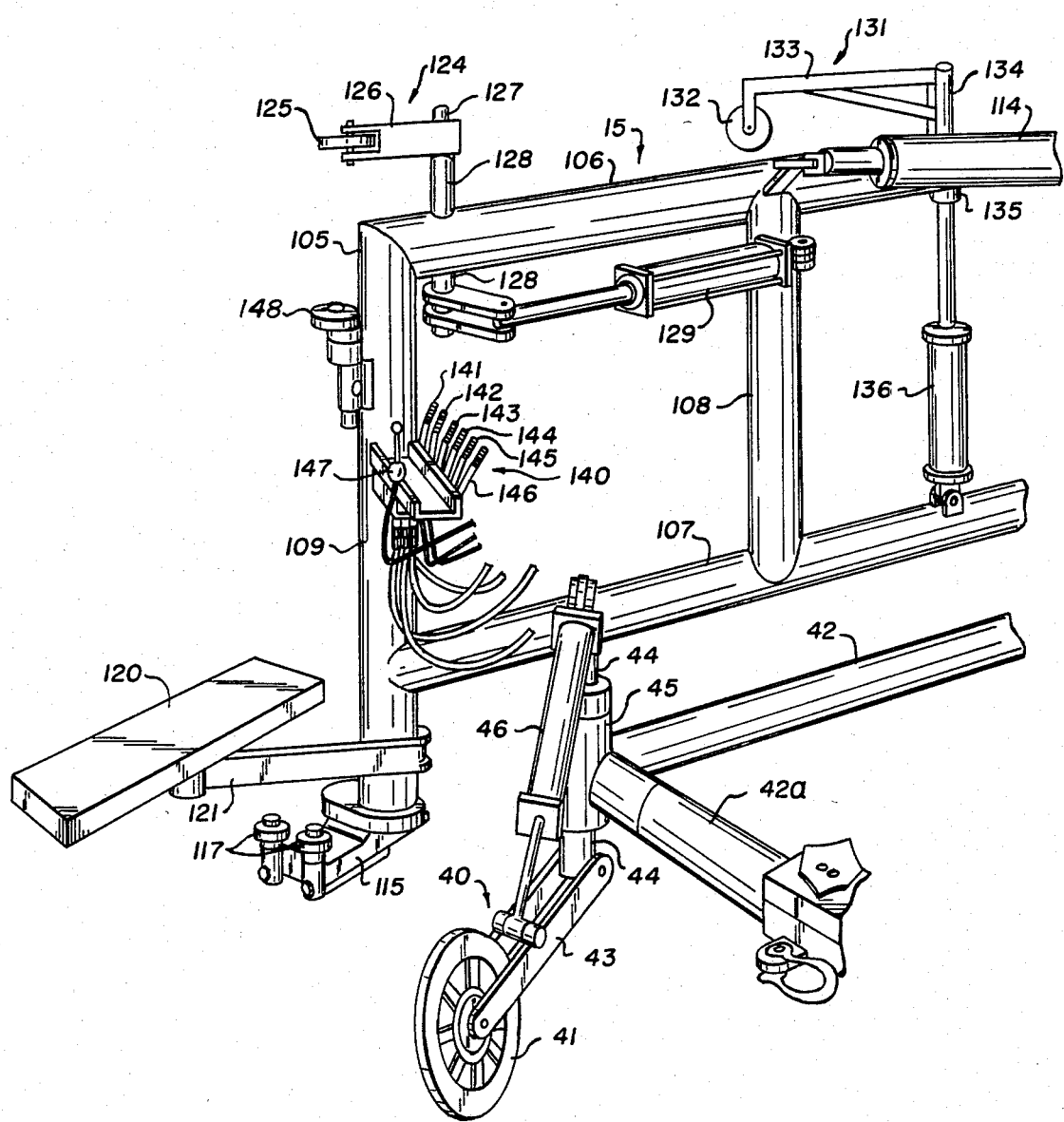
FIG. 11 is a rear perspective view of the apparatus showing the fitting arm frame and the rear dolly wheel.

Second stabilizing means 40 is provided at the rear end of the apparatus 1 adjacent the fitting frame means 15. As will be explained later, the weight of the tank wall 4 above the fitting frame means 15 is, at times, transferred to the fitting frame means 15. The second stabilizing means 40 are provided to engage the ground to stabilize the apparatus 1 when this weight is applied. As shown in FIGS. 1, 10 and 11 the stabilizing means 40 comprises a dolly wheel 41 attached to a rearwardly extending member 42 and rear cross member 42a of the chassis frame 11. The dolly wheel 41 is free to find its own path behind the apparatus 1. Thus the wheel 41 is connected through a pair of arms 43, to a pivoting shaft 44. The shaft 44 is pivotally held by sleeve member 45 which in turn is rigidly fixed to the rearwardly extending member 42. A hydraulic cylinder 46 is pivotally connected at its ends to the shaft 44 and the pair of arms 43 as shown. Expansion and contraction of cylinder 46 varies the bracing effect of the cylinder 46 applied to the dolly wheel 41 and therefore varies the stabilizing effect of the second stabilizing means 40.

The wheeled frame assembly 10 is preferably self-propelled by conventional drive means (not shown) carried by the frame assembly 10. Further, the wheeled frame assembly 10 is preferably steered by a conventional steering assembly (not shown). The steering assembly preferably includes a power steering cylinder 49 between the cross beam 26 and one of the front wheels 12. The angle of the front wheels 12 can be set and locked by this cylinder 49 to direct the wheeled frame assembly 10 on the proper circular course around the base of the tank 2. Once set, of course, the steering cylinder 49 does not need further attention by an operator.

THE TURNTABLE ASSEMBLY

The turntable assembly 13 is shown in FIGS. 5–9. As previously stated, the turntable assembly 13 is rotatably and pivotally mounted on the frame assembly 10. Preferably, it is rotatably mounted to the pivoting frame 20 for pivotal movement with said pivoting frame 20.

Figure 8:
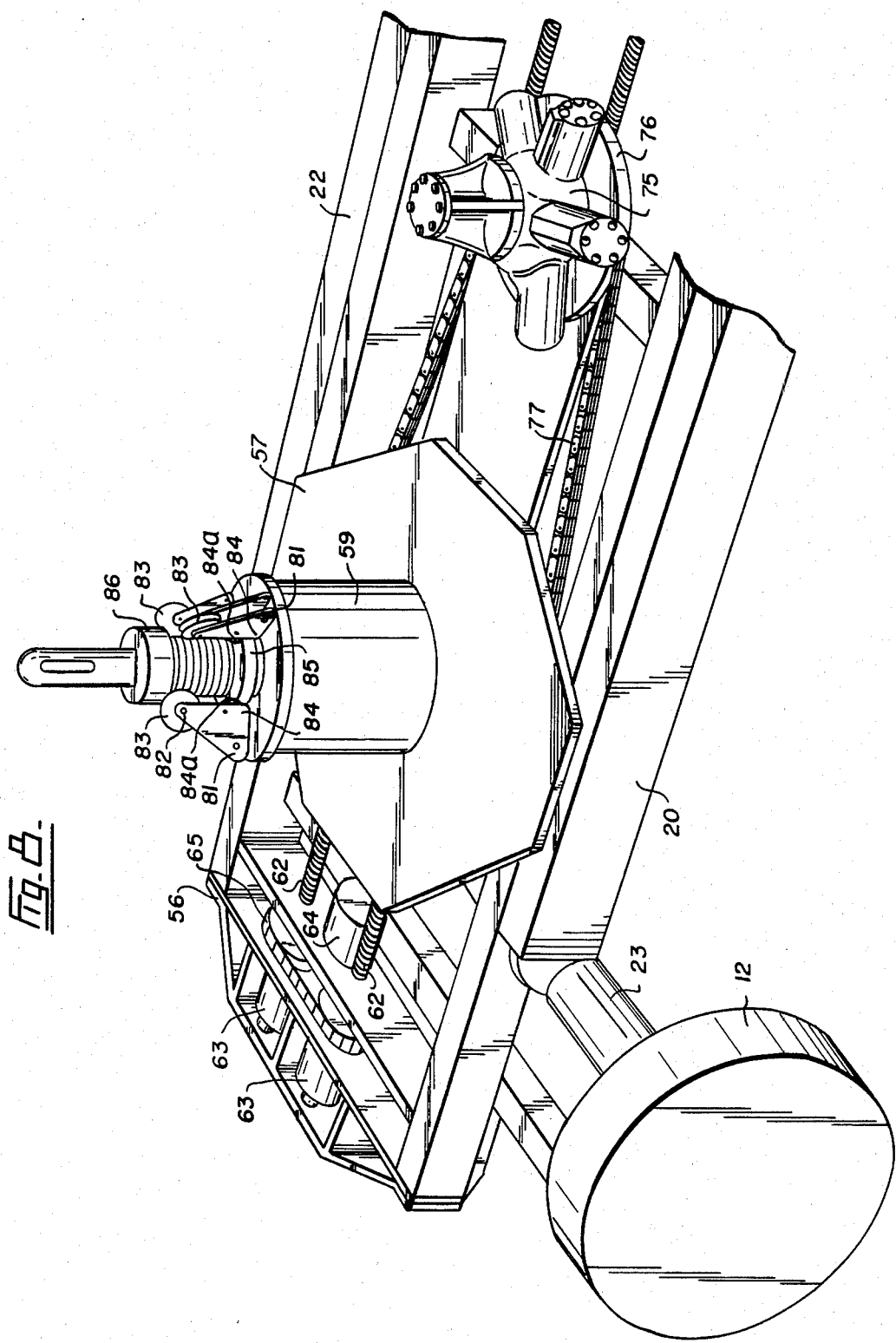
FIG. 8 is a fragmentary side perspective view of the coil pick-up frame in a coil unwinding position.

As shown in the drawings, the turntable assembly 13 is preferably mounted on the coil pick-up frame 35. This pick-up frame 35, as shown in FIG. 5, pivots between a vertical coil pick-up position (dotted lines) and a horizontal coil unwinding position (solid lines) to pick up a coil 3 of steel laying horizontally on the ground and pivot said coil to a vertically supported position on the apparatus 1. The pick-up frame 35 includes a pair of parallel, spaced side members 50 having forward and rearward ends 51, 52 respectively. The forward ends 41 are interconnected by front transverse member 56. The forward ends 51 include sleeve members 53. The sleeve members 53 are free to rotate around the front cross member 23 of the pivoting frame 20. The rearward ends 52 are connected together by rear transverse member 54. The side members 50 of the pick-up frame 35 are nested between the side beams 21, 22 of the pivoting frame 20 when the pick-up frame 35 is in the horizontal position, as shown in FIG. 8. In this position the pick-up frame 35 is supported by the front cross member 23 and the cross beam 26 of the pivoting frame 20.

Figure 6:
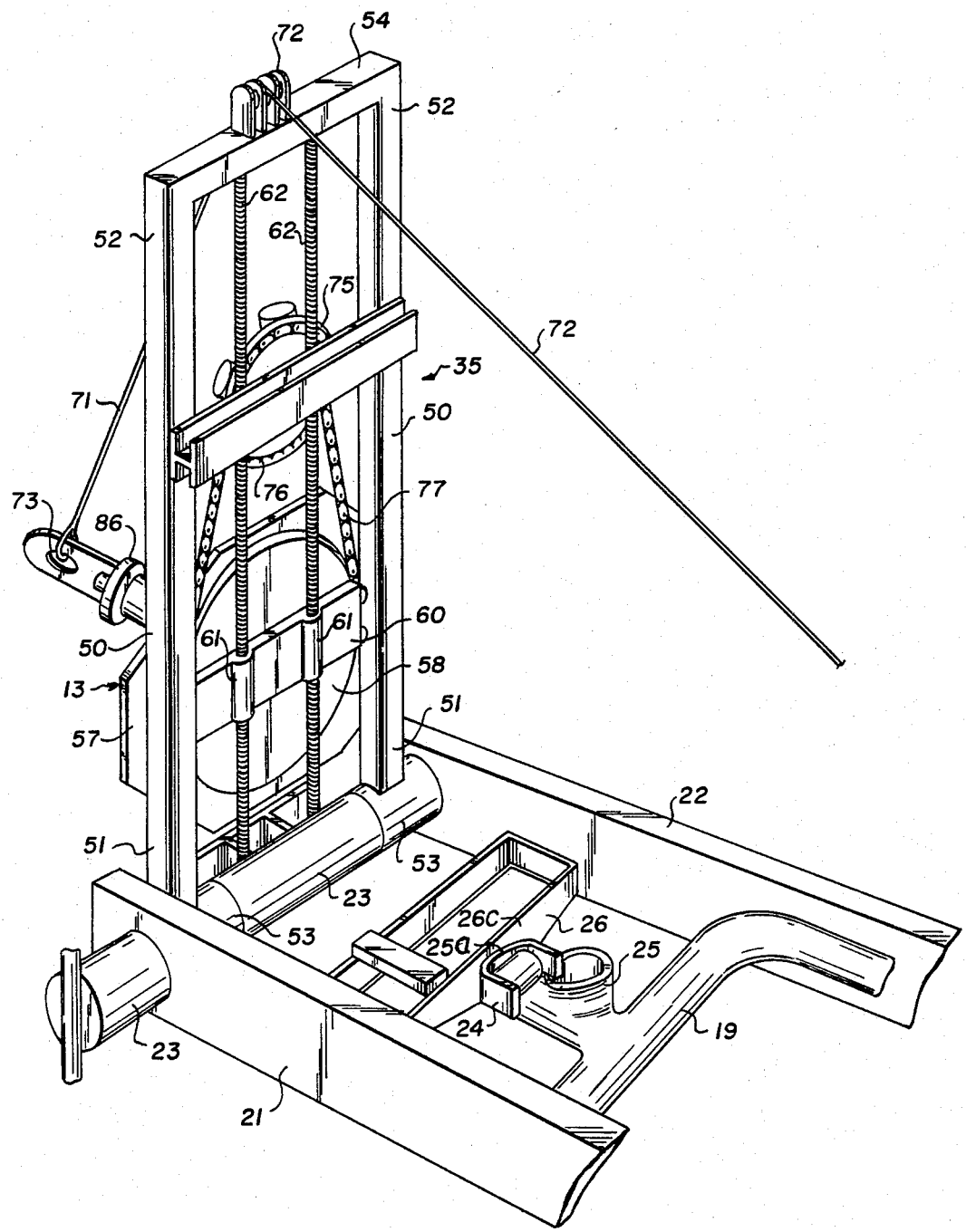
FIG. 6 is a fragmentary rear perspective view of the coil pick-up frame in a coil pick-up position.

The turntable assembly 13 comprises a rotating platform 57, pivotally mounted on a stationary platform 58 (FIG. 6). A spindle member 59 is fixed to the centre of the rotating platform 57 to further support the coil 3 of steel. The stationary platform 58 is preferably slidably mounted on the pick-up frame 35. As shown in FIG. 6, the platform 58 is rigidly fixed to a cross bar 60 positioned therebelow. The cross bar 60 has a pair of internally threaded sleeves 61 attached to its lower surface. A pair of threaded rods 62, parallel with the side members 50, extend through the threaded sleeves 61. Opposite ends of the threaded rods 62 are rotatably received in journal bearings 63 on the front and rear transverse member 56 and 54 respectively. The threaded rods 62 are rotatably driven by a hydraulic motor 64. The motor 64 turns a chain and sprocket assembly 65 attached to the forward ends of the threaded rods 62. Rotation of the threaded rods 62 moves the turntable assembly 13 forward and backward in the horizontal coil unwinding position and up and down in the vertical coil pick-up position. This movement is shown in FIG. 5. In the coil pick-up position the up and down movement of the turntable assembly 13 is used to align the spindle member 59 with the centre of the coil 3. In the coil unwinding position, forward and backward movement of the turntable assembly 13 is used to vary the angle of the strip steel 14 delivered to the straightening roller means 16 and the fitting frame means 15.

The coil pick-up frame 35 is pivoted between its vertical and horizontal positions by a winch 70, shown schematically in FIG. 5. The winch 70 is attached to the upright supports 29 of the pivoting frame 20. Winch cables 71 extend from the winch 70, over pulleys 72 on the rear transverse member 54 of the coil pick-up frame 35 through the centre of the coil 3 on the ground and down to the spindle member 59 of the turntable assembly 13. An eye 73 is provided in the spindle member 59 for attachment of the winch cables 71.

Figure 7:
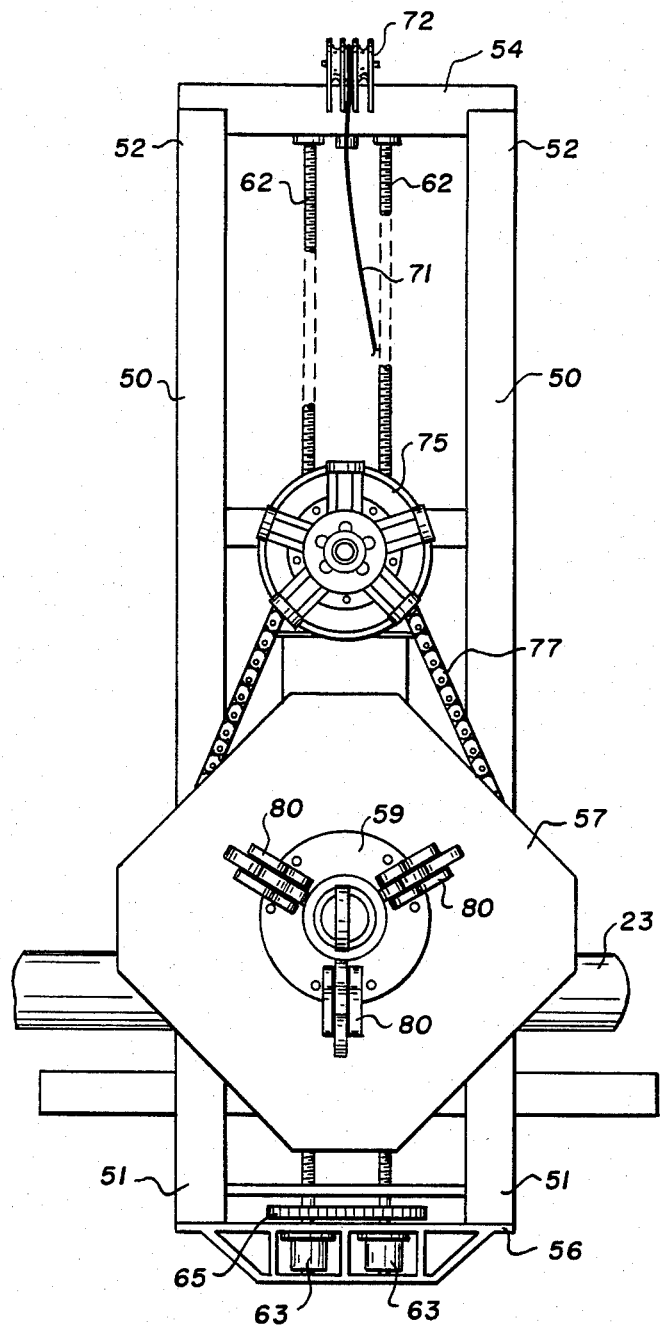
FIG. 7 is a front view of the coil pick-up frame in a coil pick-up position.

The turntable assembly 13 is preferably rotatably driven to deliver the strip steel 14. This feature has been found to be particularly advantageous when using very large coils of steel. The means for driving the turntable assembly are best shown in FIGS. 6–8. A first sprocket (not shown) is affixed to the underside of the rotatable platform 57. A hydraulic motor 75 is mounted rearwardly of the turntable assembly 13 on the coil pick-up frame 35. The motor 75 rotatably drives a second sprocket 76 mounted below the motor 75. A chain 77 interconnects the first and second sprockets to transfer rotational movement to the rotating platform 57.

The spindle member 59 preferably includes a plurality of coil centering cams 80 pivotally connected thereto. The cams 80 push outwardly against the interior surface of the coil of steel 3 to keep the coil centered on the turntable assembly. The cams 80 are triangularly shaped as shown. The first apex 81 of each cam 80 is pivotally connected to the spindle member 59. The second apex 82 includes a roller 83 pivotally connected thereto. The third apex 84 includes a roller 84a pivotally connected thereto, which roller bears against a plate member 85 of the spindle member 59. The plate member 85 is rigidly fixed to a threaded pin rod 86. The pin rod 86 is held to the spindle member 59 by an internally threaded bolt (not shown) mounted within the spindle member 59. Rotation of the pin rod 86 causes an up and down movement of the plate member 85. Upward movement of the plate member 85 lifts the rollers 84a and thus pivots the cams 80 outwardly such that the rollers 83 bear against the interior surface of the steel coil 3.

THE STRAIGHTENING ROLLER MEANS

Figure 9:
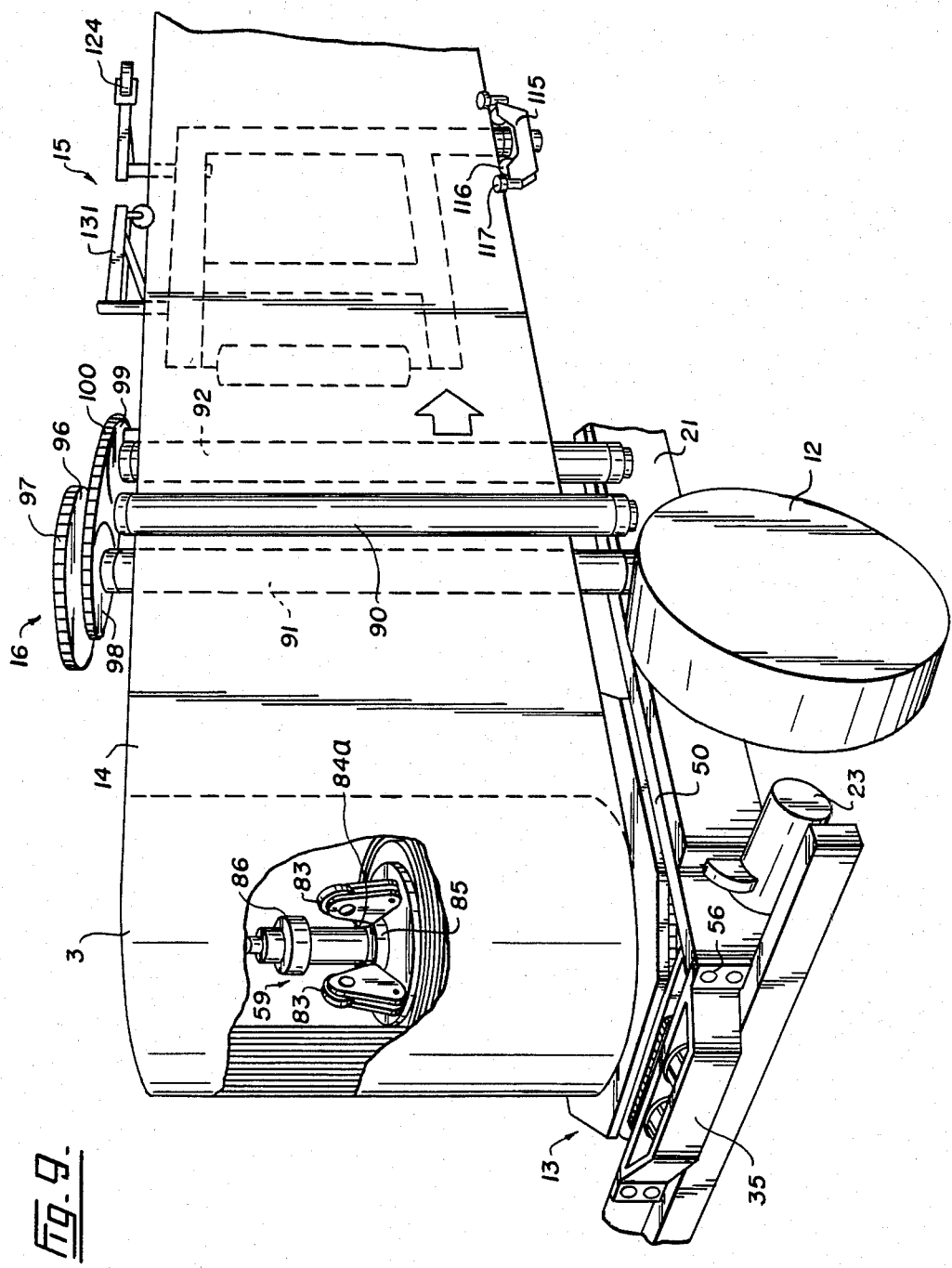
FIG. 9 is a front perspective view of the apparatus showing the coil being unwound through the straightening rollers and along the fitting arm frame.

The straightening roller means 16, best shown in FIGS. 9 and 10, is vertically mounted to the horizontal side beam 21 of the pivoting frame 20 intermediate the turntable assembly 13 and the fitting frame means 15. The roller means 16 preferably comprises common pyramid rollers, including an apex roller 90 and two base rollers 91, 92 arranged at the corners of a triangle. The rollers 90, 91, 92 are each supported by a vertical support member 93, which is attached, through horizontal arms 93a, to a vertical post 94 affixed to the side beam 21 of the pivoting frame 20. As shown in FIG. 9, the strip steel 14 is fed between the base rollers 91, 92 and the apex roller 90. The apex roller 90 is mounted for inward and outward horizontal movement relative to the base rollers 91, 92 to vary the squeezing force, and therefore the straightening effect, of the roller means 16 on the strip steel 14. To so move the apex roller 90, the upper and lower ends of the roller 90 are mounted in slotted upper and lower guide plates (not shown) and moved inwardly and outwardly therein by upper and lower hydraulic cylinder (not shown) in a manner conventional with pyramid-type rollers.

The straightening roller means 16 are preferably rotatably driven to pull the strip steel 14 from the turntable assembly 13. The means for driving the roller means includes a hydraulic motor 95, which drives a large sprocket 96 with a chain 97. The upper ends of the base rollers 91, 92 are tied together by sprockets 98, 99 respectively and a chain 100. The sprockets 98, 99 are attached to the large sprocket 96 for rotational movement therewith. Thus the rollers 91, 92 are rotatably driven at the same speed to move the strip steel 14 through the roller means 16.

The roller means 16 is preferably pivotally mounted on the pivoting frame 20 to vary the angle to the strip steel 14 delivered to the fitting frame means 15. To so pivot the roller means 16, the vertical post 94 is pivotally mounted to the side arm 21 of the pivoting frame 20. A hydraulic cylinder 102 is pivotally connected between the base of the rollers and the side beam 21 as shown. Expansion and contraction of the cylinder 102 swings the rollers in an arc toward and away from the fitting frame means 15.

Often during the tank construction it is necessary to actually place counter camber into the steel strip in the roller means 16. This counter camber causes the strip steel to ride upwardly in the roller means 16. To adjust for this action, there is some horizontal play provided for in the vertical pivot point 103 of the vertical post 94. This provision allows the roller means 16 to cant off their true vertical plane when a change in the camber of the strip steel is made.

THE FITTING FRAME MEANS

The fitting frame means 15 is shown in FIGS. 9, 10 and 11 and comprises a fitting arm 105 connected to the upright support 29 of the pivoting frame 20. Thus the frame means 15 is provided with side-to-side and forward-to-back tilting movement with the pivoting frame 20. The fitting arm 105 extends rearwardly from the upright support 29 generally parallel with the side beam 21 of the pivoting frame 20.

The fitting arm 105 is preferably pivotally mounted to the upright support 29 to provide for the generally horizontal movement shown in FIG. 2c. This horizontal movement of the fitting arm 105, together with the tilting movement thereof arising from the movement of the pivoting frame 20, aid in aligning the strip steel 14 with the tank wall 4 supported thereabove.

The fitting arm 105 consists of parallel spaced upper and lower horizontal arms 106 and 107 respectively interconnected by front and rear vertical members 108, 109 respectively. The front ends of the horizontal arms 106 and 107 are pivotally connected through pivot pins 110 and 111 to a vertical post 112 rigidly connected with the upright support 29. This connection provides for the above-described horizontal pivotal movement of the fitting arm 105. To control this horizontal pivoting movement, a hydraulic cylinder 114 is angled horizontally between the fitting arm 105 and the upright support 29 of the pivoting frame 20. The ends of the cylinder 114 are pivotally connected to the fitting arm 105 and the support 29. Expansion and retraction of this cylinder 114 swings the fitting arm 105 outwardly and inwardly respectively.

The lower end of vertical member 109 is provided with a support means 115 for supporting the lower edge of the strip steel 14. The support means 115 is bolted to the vertical member 109 as shown. The support means consists of a pair of support pulley-type rollers 116 onto which the strip steel 14 is received, and four guide rollers 117 for guiding the lower edge of the strip steel 14 through rollers 116. The strip steel 14 is threaded through the guide rollers 117 as shown in FIG. 9.

The fitting arm 105 preferably includes a platform 120 pivotally attached to the rear vertical member 109. The platform 120 supports an operator directly behind the fitting arm 105, to allow him to weld the upper edge of the strip steel supported by the fitting arm 105 to the tank wall 4 thereabove. The platform 120 is pivotally mounted to a horizontal arm 121, which in turn is pivotally mounted to the vertical member 109. This provides desirable swinging movement of the platform in a horizontal plane.

The fitting arm 105 preferably includes a push-out roller means 124 connected above the vertical member 109 for pushing outwardly against the tank wall 4 existing thereabove. The overhead tank wall 4 has a tendency to fall inwardly, especially when a section of the support structure 5 is removed to allow the apparatus and the welding process to move past. The push-out roller means 124 has been found to minimize this problem.

The push-out roller means 124 includes a roller 125 rotatably mounted on one end of a horizontal push-out arm 126. The opposite end of the arm 126 is rigidly connected to the upper end of rotating vertical post 127. The post 127 extends through a sleeve 128 mounted on the upper arm 106 of the fitting arm 105. The sleeve 128 extends through the upper arm 106. The post 127 is vertically rotatable with respect to the sleeve 128. The lower end of the post 127 is pivotally connected to the rod end of a hydraulic cylinder 129. The cylinder end of the cylinder 129 is pivotally connected to the vertical member 108 of the fitting arm 105. Extension and contraction of the cylinder 129 rotates the vertical post 127 and thereby moves the arm 126 and roller 125 outwardly and inwardly respectively relative to the overhead tank wall 4.

The fitting arm 105 also preferably includes a push-down roller means 131 connected above the upper arm 106 for pushing downwardly on the upper edge of the steel strip 14 delivered to the fitting arm 105. This action aids in maintaining a small gap between the upper edge of the strip steel 14 and the tank wall 4 for welding purposes. This resists the tendency of weld shrinkage to close the gap.

The push-down roller means 131 consists of a pulley-type roller 132 rotatably mounted at one end of a horizontal push-down arm 133. The other end of the arm 133 is rigidly connected to a vertical post 134. The post 134 is rotatably connected in a sleeve 135 on the upper arm 106 of the fitting arm 105, to enable the roller 132 to follow inward and outward swinging movement of the strip steel 14. A hydraulic cylinder 136 is vertically mounted between the lower arm 107 of the fitting arm 105 and the lower end of the vertical post 134. Expansion and contraction of the cylinder 136 moves the roller 132 and push-down arm 133 upwardly and downwardly respectively.

Controls 140 are preferably provided on the fitting arm 105, most preferably adjacent the platform 120, to permit the operator to adjust those elements of the apparatus 1 instrumental to fitting and welding of the strip steel 14 to the tank walls 4. Most preferably the controls 140 include six control levers 141–146 to independently control movement of the hydraulic cylinders 27, 32, 114, 129 and 136, and a forward speed control valve 147 to vary the forward speed of the apparatus 1. The speed of rotation of the turntable assembly 13 through the hydraulic motor 75 and the speed of the rotation of base rollers 91, 92 through the hydraulic motor 95 are coordinated to the forward speed of the apparatus 1 to provide smooth delivery of the strip steel 14. Thus the forward speed control valve 147 adjusts the speed of the hydraulic motors 75 and 95 in accordance with the forward speed of the apparatus. The control levers 141-146 permit the operator, standing on the platform, to adjust each of the pivotal movements of the pivoting frame 20, the horizontal swinging movement of the fitting arm 105, the outward force applied to the overhead tank wall 4, and the downward force applied to the upper edge of the strip steel 14.

The fitting arm 105 also preferably includes a roller 148 rotatably mounted on the outwardly facing side of the vertical member 109. The roller 148 keeps the strip steel 14 spaced a small distance from the fitting arm 105.

OPERATION

With reference to FIG. 1, the tank 2 can be constructed with the apparatus 1 of the present invention by a work force of two operators. A first operator 150 stands on the platform 120 to align and weld the strip steel 14 to the tank walls 4. The aligning operation, as previously explained, includes adjustment of the forward speed of the apparatus, the various pivoting movements of the pivoting frame 20, and the movements of the fitting arm 105 and its associated elements. A second operator (not shown) might be included to raise and lower the support structure 5 as the apparatus 1 moves by, or to assist in the welding operation.

The support structure 5 shown in FIG. 1 consists of a plurality of individually or synchronously powered hydraulic jacks 151 cylindrically arranged around the base of the tank 2 at about 20 foot intervals. Each jack 151 includes a lifting hook 152 on which to vertically support the lower edge of the tank walls 4.

In the majority of cases, the cylindrical tank 2 includes a roof 153 and a floor 154 welded to the upper and lower edges of the tank walls 4. The following description includes the details of attaching the roof 153 and the floor 154.

A circular floor 154 and roof 153 are constructed on the ground from sheet metal in a known manner. The support structure 5 is arranged circularly around the base of the tank to be constructed. The roof 153 is elevated and supported horizontally on the hooks 152 of the jacks 151. A first ring of steel is then delivered around the base of the tank 2. This first ring is preferably delivered from the apparatus 1.

The coil pick-up frame 35 is pivoted to the vertical coil pick-up position adjacent a coil 3 of steel lying horizontally on the ground. The turntable assembly 13 is adjusted upwardly or downwardly to align the spindle member 59 with the centre of the coil.

The apparatus is moved forwardly to slide the coil 3 onto the spindle member 59. The winch cable 71 is attached to the spindle member 59 and the outrigger cylinders 37 are extended to engage the ground and stabilize the apparatus 1. The coil 3 is lifted onto the apparatus 1 by pivoting the coil pick-up frame 35 to its horizontal position and moved rearwardly by threaded rods 62 to the coil unwinding position. The outrigger cylinders 37 are retracted and the apparatus 1 is driven onto the floor 154 of the tank 2.

To enter and leave the interior of the tank 2, the pivoting frame of the apparatus 1 is preferably lowered, by adjusting hydraulic cylinders 27 and elevation cylinder 32 to their lowest positions, to clear the roof 153 or the tank walls 4 supported on the support structure 5.

The strip steel 14 is fed through the straightening roller means 16 and along the fitting arm 105. The degree of straightening by the roller means 16 is adjusted by varying the spacing of the base and apex rollers 91, 92 and 90. The degree of straightening desired varies with the tank diameter and is set by trial at the beginning of each coil or course. For the first ring of strip steel, the pivoting frame 20 is preferably angled rearwardly downwardly, by adjustment of cylinders 27 and 32, to direct the strip steel toward the ground. Once the first ring of strip steel is delivered, the strip steel is severed from the coil slightly over length for the desired diameter. The supported roof 153 is then lowered on the support structure 5 and the upper edge of the first ring is welded to the roof 153. The abutting ends of the first ring of steel are then welded together to complete a first ring of the tank wall. The apparatus 1 is driven from the tank 2 for this operation. The first ring is then elevated on the support structure 5 such that its lower edge is higher than the combined width of the next ring of strip steel to be delivered and the height of the turntable assembly 13 from the floor.

The apparatus 1 is driven back into the tank and directed on a circular course beneath the first ring on the inside of the tank. The power steering cylinder 49 is locked onto the proper course. A chain (not shown) is attached between a point on the front of the apparatus 1 and a swivel point (not shown) in the centre of the tank 2. This prevents the apparatus 1 from accidentally going off course and colliding with the lifting jacks 151.

The apparatus 1 is slowly moved forwardly around the base of the tank 2, carrying the coil 33 of strip steel therearound while simultaneously delivering the strip steel along the fitting frame means 15 to the tank wall. The lower edge of the delivered strip steel is supported by the support means 115 on the fitting arm 105. The speed of delivering the strip steel from the coil 3 should be synchronized with the forward speed of the apparatus 1. Thus the rotating speeds of the turntable assembly 13 and the straightening roller means 16 are synchronized with the forward movement. This speed coordination is accomplished by setting a needle valve means (not shown) to divide the flow of oil to the respective hydraulic motors controlling forward speed, turntable rotation and roller drive. After setting this needle valve means the volume flow control can be adjusted by the operator 150, through the forward speed control valve 147, to feed strip steel as fast as he can use it.

The upper edge of the supported strip steel is mechanically aligned along the fitting arm 105 with the lower edge of the overhead tank wall 4. A gap of controlled size is also provided between the lower edge of the tank wall 4 and the upper edge of the steel strip 14 to accommodate the weld. These aligning and weld gap control operations are achieved by the separate or simultaneous movement of the fitting arm 105 itself, the push-down roller means 131, the push-out roller means 124, and the straightening roller means 16.

In the most preferred embodiment of the apparatus 1, the turntable assembly 13, the straightening roller means 16 and the fitting arm 105 are fixed to the pivoting frame 20 and thus can be adjusted simultaneously for forward-to-back and side-to-side tilting movement, for alignment purposes, through the pivoting movement of the pivoting frame 20. This movement, as previously explained, is accomplished through even or uneven movement of the hydraulic cylinders 27 through the controls 140 by the operator 150. The pivoting frame 20, and therefore the strip steel supported thereon, can be raised and lowered to align the strip steel, through movement of the elevation hydraulic cylinder 32.

The straightening roller means 16 can be moved generally horizontally relative to the tank walls, to vary the angle of the strip steel delivered to the fitting arm 105, and to therefore aid in aligning the strip steel. This angle is usually set at the beginning of the tank construction, in accordance with the tank size.

The first operator, a welder, standing on the fitting arm platform 120, can further align the strip steel through horizontal swinging movement of the fitting arm 105 relative to the tank wall 4, through adjustment of the push-down roller means 131 and the push-out roller means 124 and through adjustment of the pivotal movement of the pivoting frame 20. These several adjustments are made through the control levers 141-146 on the fitting arm 105 close to the operator 150. These controls adjust fluid flow to the hydraulic cylinders 114, 136, 129, 27 and 32, as previously disclosed.

Once aligned, the upper edge of the strip steel is affixed by welding to the lower edge of the overhead tank wall 4. These supporting, aligning and affixing operations are continued around the tank perimeter while simultaneously delivering the strip steel.

As the apparatus 1 approaches a lifting jack 151 of the support structure, the lifting jack is temporarily removed, by a second operator (not shown), to allow the apparatus to pass, and to allow the strip steel 14 to be affixed. The lifting jack 151 is removed as the support means 115 at the rear of the fitting arm 105 approaches the jack 151. Once the jack is removed, the weight of the tank wall 4 above the fitting arm 105 is transferred to the support means 115 on the fitting arm 105. The dolly wheel 41 stabilizes the rear end of the apparatus under this weight. The push-out roller means 124 pushes outwardly against the overhead tank wall 4 to resist the tendency of the wall to move inwardly. The force exerted by the push-out roller means 124 against the wall 4 is usually adjusted through the hydraulic cylinder 129. The lifting hook 152 of the jack 151 is lowered to the height of the lower edge of the strip steel in the second ring. As soon as the apparatus moves past this point, the lifting jack 151 is replaced, this time supporting the lower edge of the section of the second ring of strip steel, now affixed to the overhead tank wall 4.

Once the second ring is affixed, the strip steel is severed and the abutting ends welded together to complete a second ring of the tank wall 4. The second ring is then elevated on the support structure to a height greater than the width of the next ring of strip steel to be constructed plus the height of the turntable assembly 13 above the floor.

Additional rings of the tank walls 4 are constructed in the same manner as used for the second ring until the desired height of the tank is reached. The apparatus is then removed from the tank interior. The tank 2 is lowered on the support system 5 to ground level or a few inches thereabove. The tank floor 154 is then welded to the lower edge of the tank walls 4. Each jack 151 of the support system 5 is removed as it is approached by the welder.

While the present invention has been disclosed in connection with the preferred embodiment thereof, it should be understood that there may be other embodiments which fall within the spirit and scope of the invention as defined by the following claims.

The embodiments of the invention in which an exclusive property or privilege is claimed are defined in the following claims:

1. An apparatus for constructing cylindrical tanks from coiled strip steel, wherein the tank walls are constructed at substantially ground level and are vertically supported on a support structure, comprising:
   a wheeled frame assembly comprising a chassis frame attached to the wheels and a pivoting frame pivotally mounted on the chassis frame for both side-to-side and forward-to-back tilting movement relative to the chassis frame;
   means for so pivoting the pivoting frame;
   a turntable assembly, rotatably mounted on the pivoting frame, for substantially vertically supporting the coiled strip steel; and
   fitting frame means, mounted on the pivoting frame for movement therewith and positioned to receive the strip steel from the turntable assembly, for substantially vertically supporting and guiding the strip steel into alignment with the tank wall expected to be supported thereabove.

2. The apparatus as set forth in claim 1, comprising:
   means, associated with the chassis and pivoting frames, for raising and lowering the pivoting frame relative to the chassis frame.

3. The apparatus as set forth in claim 1, which further comprises:
   straightening roller means for removing at least a portion of the curvature from the strip steel, said roller means being mounted on the pivoting frame and being operative to receive the strip steel from the turntable assembly and to deliver it to the fitting frame means in straightened condition.

4. The apparatus as set forth in claim 2, which further comprises:
   straightening roller means for removing at least a portion of the curvature from the strip steel, said roller means being mounted on the pivoting frame and being operative to receive the strip steel from the turntable assembly and to deliver it to the fitting frame means in straightened condition.

5. The apparatus as set forth in claim 1, wherein the fitting frame means comprises:
   a fitting arm pivotally mounted to the pivoting frame for generally horizontal movement relative to the pivoting frame;
   means for so pivoting the fitting arm; and
   support means mounted on the fitting arm for supporting the lower edge of the strip steel.

6. The apparatus as set forth in claim 4, wherein the fitting frame means comprises:
   a fitting arm pivotally mounted to the pivoting frame for generally horizontal movement relative to the pivoting frame;
   means for so pivoting the fitting arm; and
   support means mounted on the fitting arm for supporting the lower edge of the strip steel.

7. The apparatus as set forth in claims 3, 4 or 6 wherein:
   the straightening roller means is driven to pull the strip steel from the coil steel on the turntable assembly; and comprising
   means for so driving the roller means.

8. The apparatus as set forth in claims 1, 2 or 5 wherein:
   the turntable assembly is rotatably driven to deliver the strip steel to the fitting means; and comprising:

means for so driving the turntable assembly.

9. The apparatus as set forth in claim 6 comprising: means for rotatably driving the turntable assembly; means for rotatably driving the straightening roller means; whereby the strip steel is positively delivered to the fitting frame means.

10. The apparatus as set forth in claim 6 which further comprises:

a coil pick-up frame pivotally mounted to the pivoting frame for rotation between a vertical coil pick-up position and a horizontal coil unwinding position, the turntable assembly being rotatably mounted on the coil pick-up frame; and means for pivoting the coil pick-up frame from the vertical to the horizontal-positions;

whereby the apparatus can pick up a coil of steel laying horizontally on the ground and pivot the coil into a generally vertically supported position on the apparatus.

11. The apparatus as set forth in claim 9 which further comprises:

a coil pick-up frame pivotally mounted to the pivoting frame for rotation between a vertical coil pick-up position and a horizontal coil unwinding position, the turntable assembly being rotatably mounted on the coil pick-up frame; and means for pivoting the coil pick-up frame from the vertical to the horizontal positions;

whereby the apparatus can pick up a coil of steel laying horizontally on the ground and pivot the coil into a generally vertically supported position on the apparatus.

12. The apparatus as set forth in claim 11, wherein:

the straightening roller means is pivotally mounted on the pivoting frame to allow for a generally horizontal movement relative to the pivoting frame, for varying the angle of the strip steel delivered to the fitting arm; and comprising means for so pivoting the straightening roller means.

13. The apparatus as set forth in claim 12, wherein the fitting frame means further comprises:

push-out roller means attached to the fitting arm for pushing outwardly against the tank wall expected to be supported thereabove.

14. The apparatus as set forth in claim 13, wherein the fitting frame means further comprises:

push-down roller means attached to the fitting arm for pushing downwardly against the upper edge of the delivered strip steel for maintaining a gap between the upper edge of the delivered strip steel and the lower edge of the tank wall expected to be supported thereabove.

15. The apparatus as set forth in claim 14, comprising:

means for moving the turntable assembly relative to the coil pick-up frame, in a forward-to-back horizontal direction when the coil pick-up frame is in the horizontal coil unwinding position and in an up and down vertical direction when the coil pick-up frame is in the vertical coil pick-up position.

16. The apparatus as set forth in claim 15, which further comprises:

first stabilizing means attached to the apparatus for engaging to ground when the coil pick-up frame is being pivoted between vertical and horizontal positions, to stabilize the apparatus under the weight of the coiled strip steel.

17. The apparatus as set forth in claim 16, which further comprises:

second stabilizing means attached to the apparatus adjacent the fitting frame means for engaging the ground to stabilize the apparatus when the weight of the tank wall above the fitting arm is transferred to the support means on the fitting frame means.

18. The apparatus as set forth in claim 5, which further comprises:

first control means on the fitting arm for adjusting the means for pivoting the fitting arm.

19. The apparatus as set forth in claim 6, which further comprises:

first control means on the fitting arm for adjusting the means for pivoting the fitting arm.

20. The apparatus as set forth in claim 13, which further comprises:

second control means on the fitting arm for adjusting the outward force applied to the overhead tank wall by the push-out roller means.

21. The apparatus as set forth in claim 14, which further comprises:

third control means on the fitting arm for adjusting the downward force applied to the strip steel by the push-down roller means.

22. The apparatus as set forth in claim 17, which further comprises:

first control means on the fitting arm for adjusting the means for pivoting the fitting arm;

second control means on the fitting arm for adjusting the outward force applied to the overhead tank wall by the push-out roller means;

third control means on the fitting arm for adjusting the downward force applied to the strip steel by the push-down roller means;

fourth control means on the fitting arm for adjusting the means for pivoting the pivoting frame; and fifth control means on the fitting arm for adjusting the means for raising and lowering the pivoting frame.

* * * * *